March 24, 1959     P. E. HOLTSCH     2,878,960
DEVICE FOR DISPENSING LIGHTED CIGARETTES
Filed July 1, 1955     7 Sheets-Sheet 1
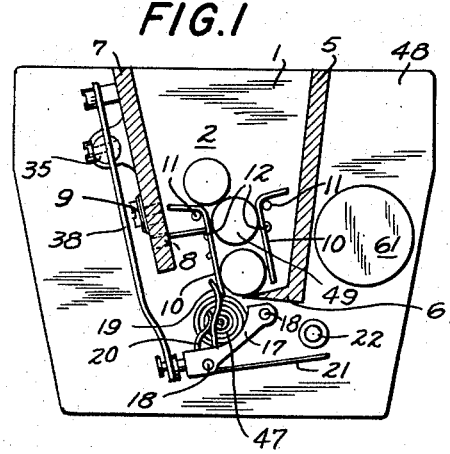
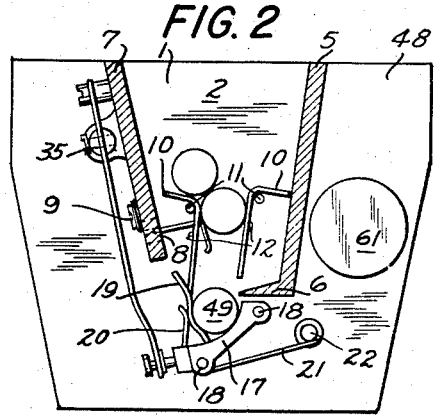
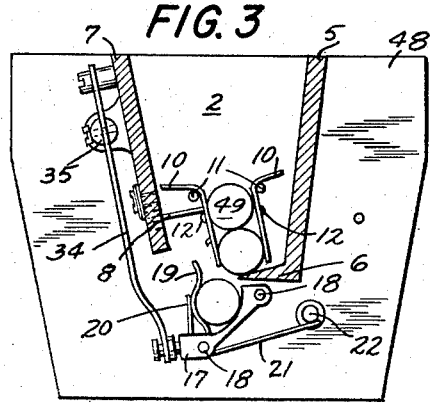
INVENTOR.
Peter E. Holtsch
BY Michael S. Striker
Attorney

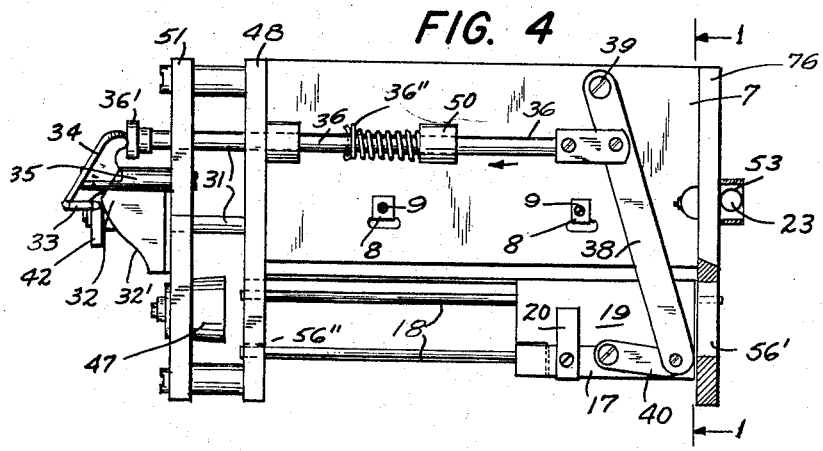
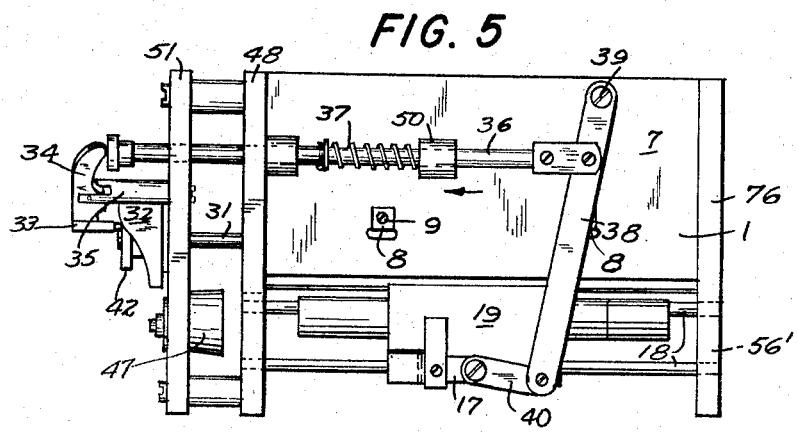
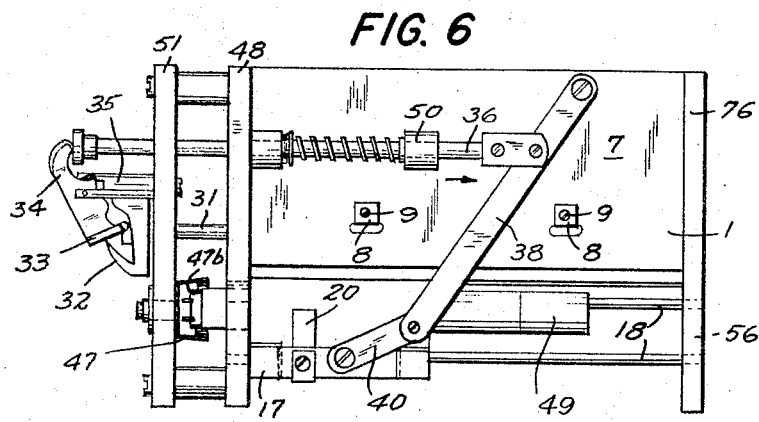

March 24, 1959 P. E. HOLTSCH 2,878,960
DEVICE FOR DISPENSING LIGHTED CIGARETTES
Filed July 1, 1955 7 Sheets-Sheet 3
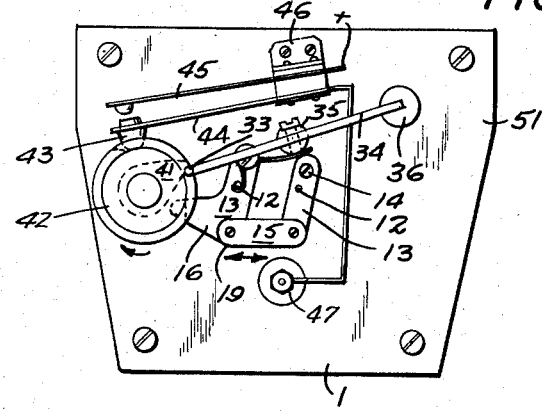
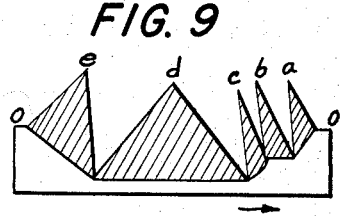
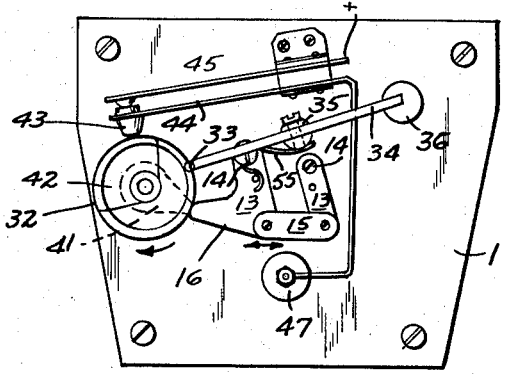
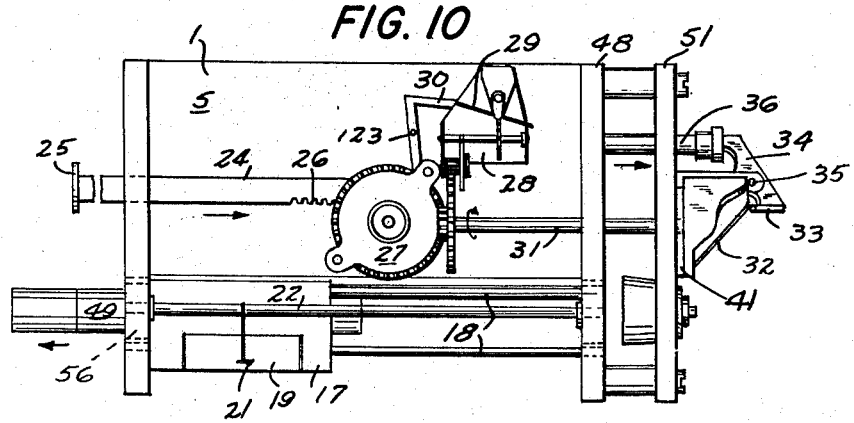
INVENTOR.
Peter E. Holtsch
BY Michael S. Striker
Attorney March 24, 1959     P. E. HOLTSCH     2,878,960
DEVICE FOR DISPENSING LIGHTED CIGARETTES
Filed July 1, 1955     7 Sheets-Sheet 4

INVENTOR.
Peter E. Holtsch
BY Michael S. Striker
Attorney

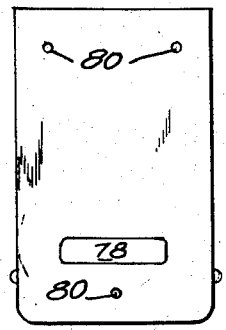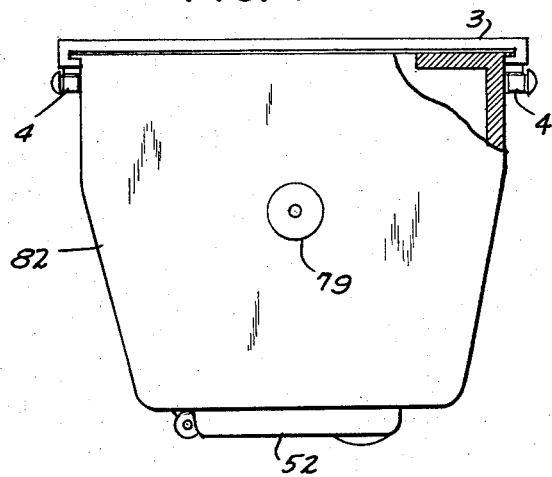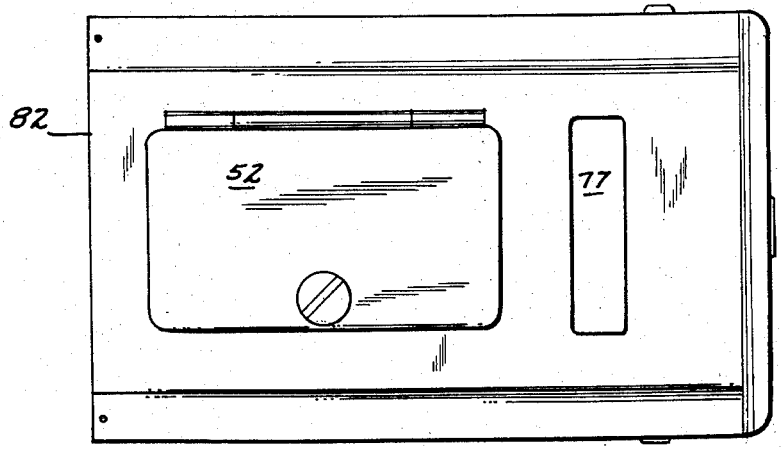

INVENTOR.
BY Peter Holtsch

March 24, 1959 P. E. HOLTSCH 2,878,960
DEVICE FOR DISPENSING LIGHTED CIGARETTES
Filed July 1, 1955 7 Sheets-Sheet 7
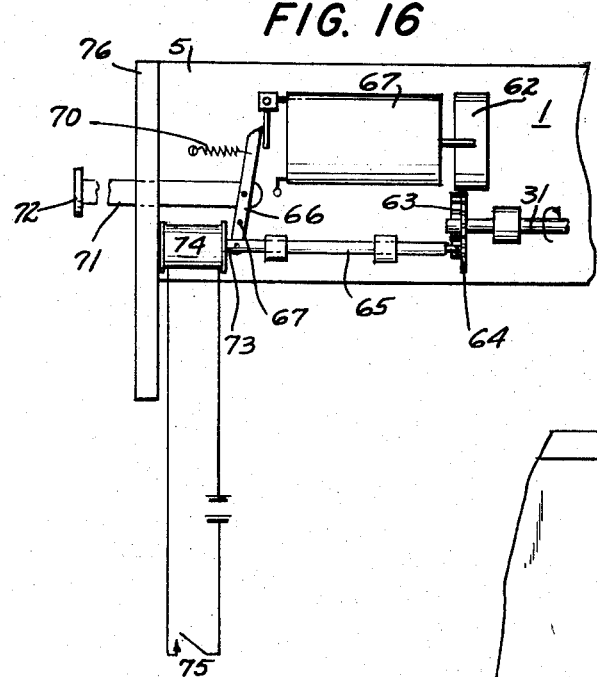
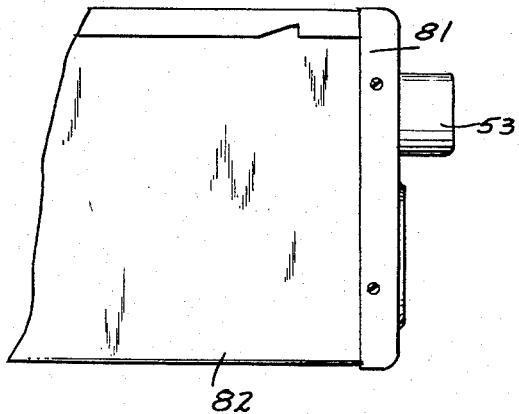
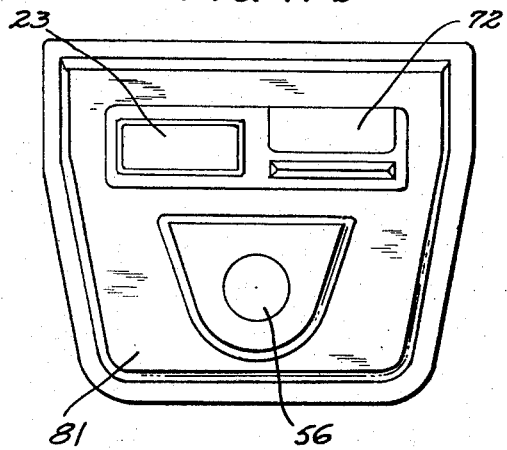
INVENTOR.
Peter E. Holtsch
BY Michael S. Striker
Attorney United States Patent Office 2,878,960
Patented Mar. 24, 1959

2,878,960

DEVICE FOR DISPENSING LIGHTED CIGARETTES

Peter E. Holtsch, Wiesbaden, Germany

Application July 1, 1955, Serial No. 519,523

31 Claims. (Cl. 221—4)

The present invention relates to a device for dispensing lighted cigarettes, and more particularly to a device in which a cigarette is automatically lighted and dispensed upon actuation of a push button.

It is the principal object of the present invention to provide a device which automatically dispenses an ignited cigarette to a position of partial ejection from the device where the user may grasp the unignited end of the cigarette.

It is an important object of the present invention to provide a device for dispensing single lighted cigarettes which is so simple in operation that it can be advantageously used in motor cars without requiring any attention by the operator of the car.

Another object of the present invention is the provision of a device for dispensing lighted cigarettes which is operated by a push button, and can be placed on a table.

Another object of the present invention is to provide a device for dispensing lighted cigarettes which is capable of igniting and dispensing all kinds of cigarettes regardless of the cross sectional shape of the same, and is even capable of igniting and dispensing cigarillos.

Another object of the present invention is the provision of feeding means capable of feeding single cigarettes from cigarettes placed at random in a cigarette magazine.

It is also an object of the present invention to provide a vending machine capable of dispensing single lighted cigarettes.

With these objects in view, a device for dispensing lighted cigarettes according to the present invention mainly comprises igniting means, a carriage movable toward and away from the igniting means, and moving between a cigarette dispensing position farther spaced from the igniting means, a cigarette igniting position closer spaced from the igniting means for urging a cigarette against the igniting means, and an intermediate cigarette receiving position in which a single cigarette is fed from a cigarette magazine to the carriage. Operating means are provided for moving the carriage and for operating the feeding means in a predetermined sequence so that the cigarette fed by the feeding means to the carriage is urged by the carriage against the igniting means and then moved away in ignited condition from the igniting means and into the cigarette dispensing position in which the cigarette partly projects out of a casing.

The operating means preferably include cam means, and according to a preferred embodiment of the present invention, a control shaft carries a control cam for moving the carriage between the positions of the same, a cam lug for operating the feeding means, and another cam for operating a switch which closes and opens the circuit of an electric igniting means, such as a heating resistance.

In a preferred embodiment of the present invention, the carriage means includes a spring-loaded clamping member for holding a cigarette on the carriage, such clamping member being operated by the feeding means.

According to a preferred embodiment of the present invention the above-described elements of the device are mounted on a support which includes two end walls and a partitioning wall between the end walls by which the igniting means is separated from the other elements of the device whereby a chimney-like passage for the smoke of the ignited cigarette is formed, and tar deposits on the other elements of the device are prevented.

In a preferred embodiment of the present invention a signal lamp is provided which is automatically lighted when a cigarette is transported by the carriage, and illuminates the dispensing opening.

The igniting means according to the present invention is an electrical resistance member preferably wound in a frusto-conical spiral so that not only the end face, but also the enveloping paper of a cigarette is engaged by the igniting means.

A preferred feeding means used in accordance with the present invention in the device for dispensing ignited cigarettes includes a pair of feeding members forming a passage for single cigarettes and being movable to a feeding position. A retaining means is provided for holding the cigarette following the cigarette which is being fed so that only a single cigarette can be fed to the carriage.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Figs. 1, 2 and 3 are cross sectional views taken on line 1—1 in Fig. 4 illustrating different operational positions of the device of the present invention;

Figs. 4, 5 and 6 are side views of a device according to the present invention illustrating different operational positions of the carriage means;

Figs. 7 and 8 are rear views of the device illustrating two different operational positions;

Fig. 9 is a developed view of a control cam track for operating the carriage;

Fig. 10 is a side view of one embodiment of the present invention in which a clock mechanism is provided;

Fig. 14a is a top view of a housing for a device according to the present invention on a reduced scale;

Fig. 14b is a rear view of the housing;

Fig. 14c is a bottom view of the housing;

Fig. 15b is a sectional view of the control cam means taken on line 15b—15b in Fig. 15a;

Fig. 16 is a fragmentary side view of a modified embodiment of the present invention permitting remote control of the device and particularly suited for vending machines;

Fig. 17a is a fragmentary side view of a housing including a front cover member; and Fig. 17b is a front view of the front cover member.

Figure 14D:
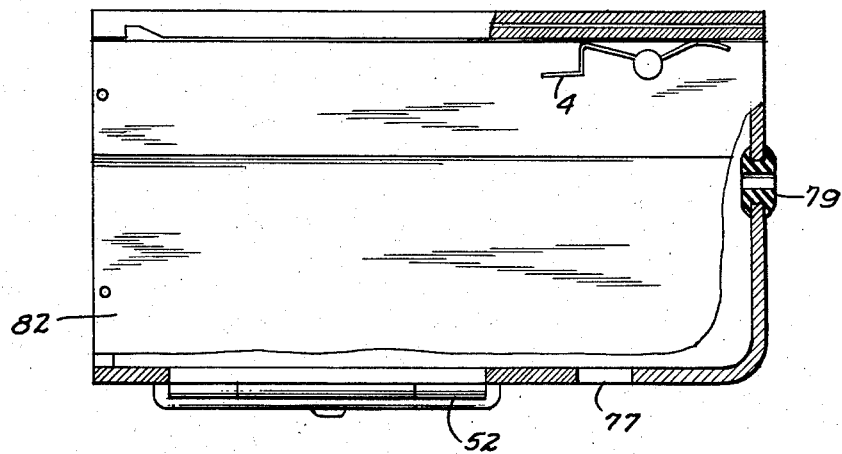
Fig. 14d is a side view of the housing.

Referring now to the drawings, and more particularly to Figs. 1-8, in a support 1 which includes two end walls 51 and 76, and a partitioning wall 48 intermediate the end walls, a cigarette magazine 2 is arranged between the partitioning wall 48 and the end wall 76. The cigarettes are placed at random in the magazine 2 and are guided by the walls 5 and 7 to the feeding means for feeding single cigarettes which will be described in greater detail hereinafter. An outer housing 82 shown in Figs. 14a–14d, envelops the device. The top of the housing 82 is formed by a cover plate 3 which is slidably mounted on the housing 82 and has a slot 78 permitting the smoke to pass out of the housing. In the event that the device according to the present invention is mounted in a motor car, the cover plate 3 is attached to the dashboard or secured to the lateral walls of the car, or mounted on the back of the front seats. In any event, when the cover plate 3 is fixedly attached to a support, the housing 82 can be drawn out for the insertion of cigarettes while sliding on the fixed cover plate. The housing 82 is arrested in drawn out position by two laterally arranged resilient catch means 4. As best seen in Fig. 14b, the bottom of the housing 82 is provided with a cleaning opening 54 and with a ventilating opening 77. A receptacle 52 is removably or pivotally attached to the bottom of the housing and covers the cleaning opening. Particles which fall off during the igniting of the cigarette drop through the opening 54 into the receptacle and can be removed whenever desired. An opening 79 is provided in the rear wall of the housing through which an electric wire passes into the interior of the device.

The front of the housing is preferably covered by a front cover member 81, best seen in Figs. 17a and 17b. A dispensing opening 56 is provided in the front cover member 81 through which the ignited cigarette is partly ejected, as will be described hereinafter in greater detail.

A housing 53 is provided on the front cover member for a signal lamp, and is open in the direction of the dispensing opening 56 so that the dispensing opening 56 is illuminated when the signal lamp is lighted.

Referring again to Figs. 1, 2 and 3, in the lower portion of the cigarette magazine 2 are arranged two outlet members 10 which have an angular cross section and include two downwardly directed walls forming a passage for single cigarettes. The outlet members 10 are mounted for pivotal movement on pins 11 and carry pins 12 which project through suitable openings in the walls 48 and 51 to the outer rear face of the end wall 51. A pair of levers 13 which are pivotally mounted on the end wall 51, as best seen in Figs. 7 and 8, are connected to the pins 12, so that pivoting of the levers 13 results in pivoting of the outlet members 10 about the pivot pins 11. The free ends of the levers 13 are connected by a pivoted link 15 so that levers 13 and outlet members 10 move parallel to each other. A spring 55 urges the levers 13 and the outlet members 10 to turn in one direction.

The pair of outlet members 10 extends through the entire length of the magazine 2 which substantially corresponds to the length of a regular or king-size cigarette. In Fig. 1 a cigarette retaining position of the outlet members 10 is illustrated in which the passage formed between the outlet members 10 is closed by a projection 6 which extends adjacent the outlet of the magazine. When the outlet members 10 are pivoted into the cigarette feeding position shown in Fig. 2, the cigarette which was supported on the supporting projection 6 is free to move downwardly.

One of the outlet members 10 is formed with openings which are located opposite a pair of retaining means 8 which pass through openings in the wall 7 and are secured to the outside of wall 7 by screws 9. The free ends of the retaining means 8 are bent and are located in the openings of the retaining member 10 when the same is in the cigarette retaining position shown in Fig. 1. When the outlet members 10 move to the cigarette feeding position shown in Fig. 2, the free ends of the retaining means 8 project into the passage between the outlet members 10 and retain all cigarettes but the foremost cigarette which is being fed.

Underneath the outlet opening of the magazine 2 guide rails 18 are provided between the walls 48 and 76 on which a carriage means 17 is slidably arranged for movement between a dispensing and rest position shown in Fig. 4, an intermediate cigarette receiving position shown in Fig. 5, and a cigarette igniting position adjacent the partitioning wall 48 shown in Fig. 6. The carriage means 17 includes a clamping member 19 which is pivotally mounted on the main portion of the carriage and is urged by a spring 20 to move to a fully advanced position shown in Fig. 1. One of the outlet members 10 engages the clamping member 19, and since the outlet member 10 extends substantially through the entire distance between the walls 48 and 76, while the clamping member is much shorter, the clamping member 19 slides on the respective outlet member 10 during movement of the carriage means from the position shown in Fig. 4 to the position shown in Fig. 5. While the carriage moves from the position of Fig. 5 to the position of Fig. 6, the respective outlet member 10 is spaced from clamping member 19 as shown in Fig. 3.

When the outlet members 10 are pivoted to the position shown in Fig. 2 the clamping member 19 is moved against the action of the spring 20 to a retracted position. In this position the cigarette 49 is placed by the outlet members 10 on the carriage, as best seen in Fig. 2. When the outlet members 10 move back to the cigarette retaining position shown in Fig. 3, the clamping member 19 is released by the respective outlet member 10, and is urged by a spring 20 against the cigarette 49.

A resilient contact 21 is secured to clamping member 19 and engages a contact rod 22 extending between walls 48 and 76 when the clamping member 19 is either in the clamping position shown in Fig. 3 or in the retracted position shown in Fig. 2. When the clamping member 19 is in the fully advanced position shown in Fig. 1 the contact 21 is spaced from the contact rod 22. The contact 21 slides on the contact rod 22 during movement of the carriage means 17. The contact means 21, 22 are connected into the circuit of a signal lamp 23, see Fig. 4, so that the signal lamp 23 is energized whenever a cigarette is held by the clamping member 19 on the carriage 17. The housing 53 of the signal lamp 23 is provided with a downwardly directed opening for illuminating the dispensing opening 56' in the wall 76.

Figure 11:
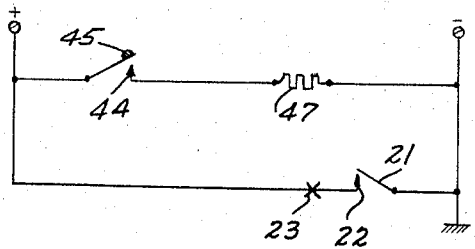
Fig. 11 is a diagram showing the electrical connections of a device according to the present invention as shown in Fig. 10.
Figure 13:
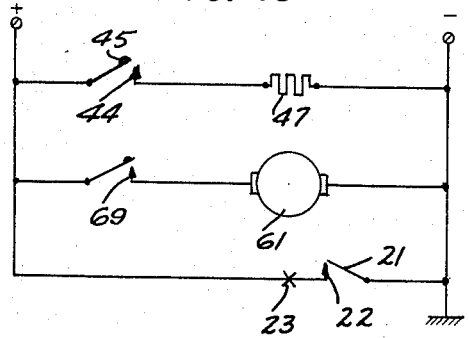
Fig. 13 is a diagram illustrating the electrical connections for a modified embodiment shown in Fig. 12.

An igniting means 47 is mounted on the end wall 51 opposite an opening 56" in wall 48. The igniting means is an electric heating resistance connected into a circuit which includes the switch 44, 45 (see Figs. 7 and 8). When the contacts 44, 45 are closed, current flows through the electric resistance 47. The contact springs 44 and 45 are mounted on a bracket 46 insulated from the wall 51. The contact 45 is connected to a source of current, such as a battery, and the contact spring 44 is connected to the resistance 47, as shown in Figs. 11 and 13.

According to one embodiment of the present invention illustrated in Fig. 10, the device is automatically operated by a clock mechanism 27 which includes a winding gear meshing with a rack bar 26 on a push rod 24. A push button 25 is secured to the end of the rod 24 and projects through a suitable opening in the front wall 76. When the button 25 is pressed, the clock mechanism 27 is wound up. Upon release of the button 25 the clock mechanism 27 starts running for actuating the device. Gear transmission means connect the clock mechanism 27 with a dampening and regulating means 28 including adjustable fan vanes 29 which produce a draft for removing smoke from the device. The time of operation of the clock mechanism 27 can be adjusted by adjustment of the fan vanes 29, as well as by a brake means 30. The clock mechanism 27 is coupled to a control shaft 31 which passes through the walls 48 and 51 and carries a plurality of cam means.

Figure 12:
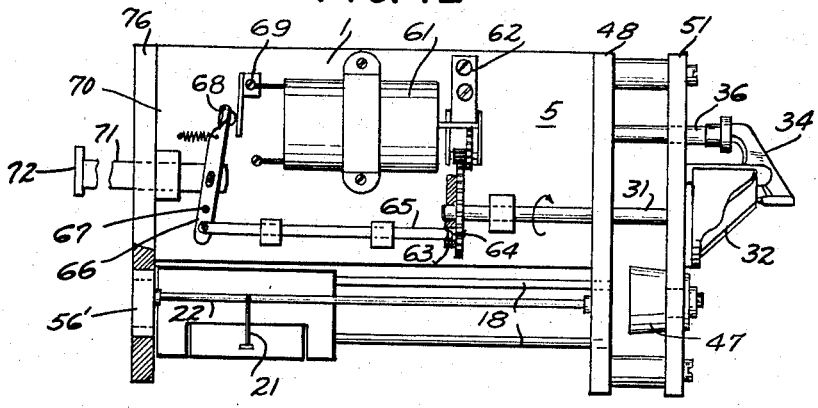
Fig. 12 is a side view of another embodiment of the device which is operated by an electric motor.

In the embodiment illustrated in Fig. 12 instead of the clock mechanism an electric motor 61 is provided which drives the control shaft 31 through a reduction transmission means 62. This arrangement will be described in greater detail later on.

Figure 15A:
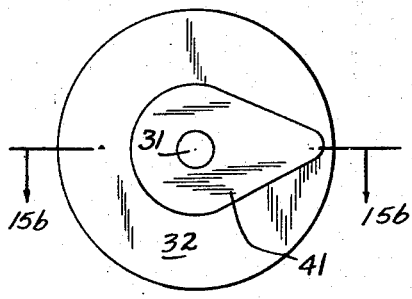
Fig. 15a is a rear end view of control cam means according to the present invention taken in the direction of the arrow 15a in Fig. 15b.
Figure 15B:
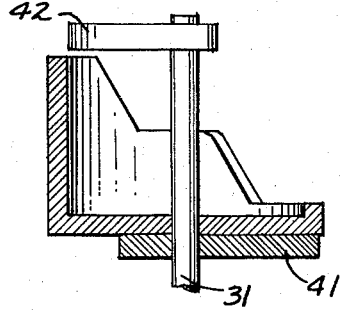
Figure 15C:
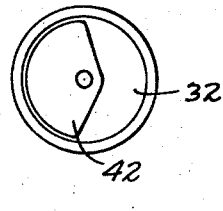
Fig. 15c is a fragmentary end view of the control cam means taken in the direction of the arrow 15c in Fig. 15b.

In both embodiments of the present invention, the control shaft 31 is driven for a predetermined time period by rotary drive means 27 and 61, respectively. The control shaft 31 projects beyond the wall 51 and carries on its free end cam means shown in detail in Figs. 15a–15c.

A cam lug 41 is provided for operating the feeding means, as best seen in Figs. 7 and 8 and engages during rotation of the control shaft 31 the projection 16 of one of the levers 13. Consequently, during rotation of control shaft 31, the levers 13 are pivoted for a short time for moving the outlet members 10 from the cigarette retaining position shown in Fig. 1 to the cigarette feeding position shown in Fig. 2, whereupon the spring 55 moves the outlet members back to the cigarette retaining position as shown in Fig. 3.

The control shaft 31 also carries a control cam means 32 which has a tubular shape and is bounded at one end by a control cam track 32' which is shown in a developed view in Fig. 9.

Motion transmitting means including a cam follower pin 33 sliding on the control cam track 32' connect the control cam means 32 with the carriage 17. These motion transmitting means include a double-armed lever 34 pivotally mounted on a bolt 35 and carrying at one end thereof a cam follower pin 33, while the other end of lever 34 is located opposite the head 36' of a control rod 36 which is pivotally connected to a lever 38 at the end thereof. Lever 38 is pivotally mounted by pivot means 39 on wall 7 of the magazine and pivotally connected at the other end thereof another lever 40 which is pivotally connected to the carriage means 17. A spring 37 abuts at one end thereof against an abutment 50 fixed on the wall 7 and engages at the other end thereof a washer 36" which is secured to the control rod 36. Consequently, the control rod 36 is urged to the left in Fig. 4 into engagement with the double-armed lever 34 so that the cam follower pin 33 is urged into engagement with the cam track 32'. On the other hand, the control rod 36 tends to pivot the lever 38 about point 39 so that the carriage means 17 tends to move from the dispensing position shown in Fig. 4 to the igniting position shown in Fig. 6. Such movement, however, is controlled by the cam track 32'.

The control shaft 31 further carries a cam 42 consisting of an insulating material and cooperating with a cam follower projection 43 on the resilient contact 44 of the switch 44, 45. During rotation of the control shaft 31 the switch 44, 45 is closed and opened in a predetermined sequence with the movement of the carriage 17 and with the movement of the feeding means 10. It is therefore apparent that the cam means 32, 41 and 42 constitute operating means for operating the feeding means, the carriage means, and the switch for energizing the igniting means 47 in a predetermined sequence.

The igniting means 47 includes a cup-shaped supporting member 47a, and a band-shaped electric resistance means 47b, best seen in Fig. 6. The electric resistance member 47b is wound in a substantially frusto-conical spiral so as to have a substantially frusto-conical surface if made of a wire. The cigarette 49 urged against the igniting surface of the igniting means 47 is engaged at the front face thereof by an edge of the band-shaped resistance member, while the main face of the band-shaped resistance member envelops the cylindrical surface at the front end of the cigarette and is located adjacent the cigarette paper, so that the cigarette is reliably ignited when pressed against the igniting means 47.

A cup-shaped support 47a is formed with deep recesses so that air can pass between the walls 48 and 51 and through the cup-shaped support 47a to produce a draft which improves the igniting action. In the event that the device is mounted in a car, the draft produced by driving can be guided into the chimney-like passage between the walls 48 and 51 through a suitable slot in the housing.

It will be understood that the partitioning wall 48 is formed with slots and bores permitting passing of the control shaft 31, of the pins 12, and of the control rod 36 and of the cigarette 49.

As pointed out above, the device can be driven by a clock mechanism or by an electric motor. The embodiment in which an electric motor is provided will now be described with reference to Figs. 12 and 13. An electric motor 61 is mounted on the wall 5 of the magazine 2, and drives the control shaft 31 through the reduction transmission 62. The inner end of the control shaft 31 carries a blocking disc 63 having a bore or recess 64. A contact lever 66 is mounted on wall 5 pivotable about a pin 67 and is pivotally connected to the operating rod 71 of the push button 72. A spring 70 tends to retract the lever 66. A blocking rod 65 is pivoted to one end of the contact lever 66 and slidably mounted for movement in longitudinal direction on bearings on the wall 5. The other end of the blocking rod 65 slides on the blocking disc 63 during rotation of the control shaft 31 and since the spring 70 urges the blocking rod 65 into engagement with the blocking disc 63, the blocking rod 65 snaps into the recess 64 in a predetermined position of the blocking disc 63. Consequently, when the push button 72 is depressed, the contact 68, 69 is closed and the motor 61 starts to rotate and drives through the reduction transmission 62, the control shaft 31 and the blocking disc 63 which is possible since the blocking rod 65 is retracted from the recess 64 when the push button 72 is actuated. After one revolution of the blocking disc 63, the blocking rod 65 snaps into the recess 64 so that the contact 68, 69 is interrupted and the motor stops. The movement of the blocking rod into blocking position is possible when the push button 72 has been released in the meantime. During the revolution of the blocking disc, cam means 32, 41 and 42 operate the device. In the embodiment shown in Fig. 12 the device is manually operated by depressing the push button 72 as is suitable for use in a motor car, or when the device is used as a table lighter.

In the embodiment illustrated in Fig. 16, the contact lever 66 and the blocking rod 65 are operated by an electromagnetic means 74 the armature of which is secured to the blocking rod 65, or forms an extension of the same. The electromagnetic means includes a winding connected into a circuit having a switch 75. In this arrangement the device according to the present invention can be operated by remote control. The embodiment of Fig. 16 finds a particularly advantageous use in a vending machine. It will be apparent that the sale of single lighted cigarettes will have a particular appeal to the public.

The operation of the device for dispensing lighted cigarettes in accordance with the present invention will now be described:

The magazine 2 is filled with cigarettes after the cover plate 3 has been moved relative to the housing 82 to expose the magazine. As best seen in Fig. 1 the lower-most cigarettes 49 are in the passage between the outlet members 10, and rest on the projection 6. When the button 25 is depressed, the operating rod 24 winds up the clock mechanism 27, which starts to run and turns the control shaft 31 and the cam means 32, 41 and 42. The rod 36 is pressed by the spring against the lever 34 and holds the carriage in the position shown in Fig. 4. When the control cam track 32' moves along the cam follower 34, the cam track portion a (see Fig. 9) permits movement of the carriage 17 under the action of the spring 37 into the position shown in Fig. 5. The cam lug 41 is so positioned on the control shaft 31 that the cam projection 16 of the lever 13 is engaged by the cam lug 41 when the carriage 17 is in this intermediate cigarette receiving position. As best seen in Figs. 7 and 8, the levers 13 are pivoted by the cam lug 41 and effect movement of the outlet members 10 from the position shown in Fig. 1 to the position shown in Fig. 2.

The lowermost cigarette 49 is pushed off the projection 6 and drops onto the carriage 17 which is possible since the clamping member 19 has been moved by one of the outlet members 10 into the retracted position shown in Fig. 2. Thereupon the cam 41 releases the cam follower projection 16 and the outlet members 10 return to the position shown in Fig. 3, while the cigarette on the carriage 17 is lightly clamped by the clamping member 19 under the action of the spring 20. During this operation the second cigarette is held by the retaining means 8 until the position of Fig. 3 is again assumed by the outlet members 10. In this position the second cigarette drops onto the projection 6 while another cigarette enters the passage between the outlet members 10. During this operation, the contact spring 21 engages the contact rod 22 since the clamping member 19 has moved out of the position of Fig. 1 in which the contacts 21 and 22 are separated. The signal lamp 23 lights up and indicates the presence of a cigarette on the carriage.

During these operations, the carriage means 17 is held in the intermediate cigarette receiving position shown in Fig. 5 by the cam track portion b. After completion of the transfer of a single cigarette to the carriage, the cam track portion c permits movement of the carriage 17 under the action of the spring 37 to the cigarette igniting position shown in Fig. 6. The cigarette held by the clamping member 19 on the carriage 17 is urged against the igniting face of the igniting means 47. Any time during the movement of the carriage means from the position of rest shown in Fig. 4 to the cigarette igniting position shown in Fig. 6, and preferably while the carriage is in the intermediate cigarette receiving position shown in Fig. 5, the leading end of the cam 42 engages the cam follower 43 on the switch contact 44 and closes switch 44, 45 so that current flows through the heating resistance 47b of the igniting means 47. Due to the shape of the cam track of the cam 42 (see Fig. 15c) the switch 44, 45 is held closed for a considerable time until the cigarette is lighted.

The carriage 17 is now in the igniting position shown in Fig. 6 and urges the end of the cigarette 49 against the frusto-conical surface of the igniting means 47, while the cam track portion d is effective. Due to the length of this portion, the cigarette is held for about six to ten seconds in igniting position so that the cigarette is reliably ignited particularly due to the draft produced in the chimney-like passage between the walls 48 and 51 which communicates with slots in the housing. As shown in Figs. 14b, 14c and 14d a cleaning slot 54 is arranged underneath the igniting means 47 so that ashes and tobacco particles are collected in the receptacle 52. In the event that fan vanes 29 are provided, the draft produced by the same improves the igniting action. After the cigarette is ignited, the portion e of the control cam track 32' urges the carriage 17 to move from the cigarette igniting position to the cigarette dispensing position shown in Fig. 4. The cigarette 49 projects in this position through the openings 56' in the wall 76 and the opening 56 in the front cover of the casing as shown in Fig. 17b. The signal lamp 23 is still lighted and illuminates through suitable openings the dispensing opening 56. During movement of the carriage means to the cigarette dispensing position, the trailing end of the cam track of cam 42 releases the cam follower projection 43 on the switch 44, 45 (see Fig. 7) and the resilient contact springs 44 and 45 separate so that the heating resistance 47b is disconnected from the source of current. The cigarette is in dispensing position projecting out of the casing and can be manually removed which is possible since the clamping member 19 only lightly holds the cigarette 49. When the cigarette is removed through the dispensing opening 56, the clamping member 19 returns to its initial position shown in Fig. 4, and the contacts 21, 22 separate so that the signal lamp 23 is disconnected. The device is now ready for the next operation.

It should be noted that due to the light pressure exerted by the clamping member 19 on the cigarette 49, the cigarette can slide relative to the carriage 17 when the carriage moves to the cigarette igniting position shown in Fig. 6 while the end portion of the cigarette abuts against the igniting means 47. This arrangement makes possible the use of the device for cigarettes of different lengths such as regular and king size cigarettes. The clamping member 19 also adjusts the device to cigarillos which are slightly longer and thicker than cigarettes.

The operation of the embodiment shown in Fig. 12 corresponds to the operation described above. The only difference is that instead of a clock mechanism, an electric motor 61 turns the cam means 32, 41, 42 through a reduction gear 62. While the time of operation of a clock mechanism is predetermined, blocking means must be provided in the arrangement of Fig. 12 for stopping the motor 61 after the cigarette has been ignited and moved to the dispensing position. As described above, the blocking disc 63 performs one revolution while a control cam 32 effects the carriage movements since the blocking disc is mounted on the same shaft 31. Consequently, after one revolution of the control shaft 31, the blocking rod 65 snaps into the recess 64 of the blocking disc 63 and separates the contacts 68, 69 which were closed by operation of the push button 72. It will be understood that the push button 72 can be released any time after closing of the switch 68, 69, since the end of the blocking rod 65 slides on the disc 63 when the motor 61 starts rotation so that the contacts 68, 69 cannot open before one revolution of the blocking disc 63 has been completed and the recess 64 is again opposite the blocking rod 65. Due to this arrangement the electric motor 61 turns the control shaft 31 only through a single revolution required for controlling all operations required for igniting and dispensing a single cigarette.

In the embodiment shown in Fig. 16 closing of the coin-operated switch 75 effects closing of the contacts 68, 69, starting of the motor 61 and release of the blocking disc 63 by blocking rod 65. Thereupon, the motor 61 rotates control shaft 31 and the control cams while the blocking rod 65 slides in the blocking disc 63 under the action of spring 70. After one revolution the blocking rod snaps into the recess 64 and opens the contacts 68, 69, assuming that the switch 75 has been opened in the meantime. Otherwise, the operation would be repeated and another cigarette dispensed.

A plurality of switches 75 can be connected in the circuit so that it is possible to operate the device from different locations.

From the above description of the operation of the device for dispensing lighted cigarettes according to the present invention, it will be understood that the operating means 61, 31, 32, 41, 42, 34, 36, 38, 40; 16, 13; and 43, operate the feeding means 10, 8, 6 for feeding single cigarettes in a predetermined sequence with the movement of the carriage means 17, 19, and with the operation of the switch 44, 45.

It will be understood that each of the elements described above, or two or more together, may also find a useful application in other types of cigarette dispensing devices differing from the types described above.

While the invention has been illustrated and described as embodied in a device for dispensing lighted cigarettes including a carriage for transporting a single cigarette between an igniting position and a dispensing position projecting out of a casing, it is not intended to be limited to the details shown, since various modifications and structural changes may be made without departing in any way from the spirit of the present invention.

What is claimed as new and desired to be secured by Letters Patent is:

1. In a device for dispensing lighted cigarettes, in combination, a circuit including a switch; heating resistance means connected into said circuit and being in igniting condition when said switch is closed; carriage means movable toward and away from said heating resistance means between a cigarette receiving position farther spaced from said heating resistance means and a cigarette igniting position closer spaced from said heating resistance means, said carriage means including a spring loaded clamping member movable between a retracted position and a cigarette clamping position for slidably holding a cigarette on said carriage means, said clamping member tending to assume said clamping position; a cigarette magazine; feeding means for feeding single cigarettes from said cigarette magazine to said carriage means when the same is in said cigarette receiving position, said feeding means including at least one movable outlet member movable between a cigarette feeding position and a cigarette retaining position, said outlet member engaging said clamping member in said cigarette receiving position of said carriage means and moving said clamping member to said retracted position during movement of said outlet member to said feeding position; and operating means including cam means respectively connected to said carriage means, said switch means, and said movable outlet member for operating said carriage means, said switch, and said outlet member in a predetermined sequence so that a cigarette fed by said outlet member to said carriage is clamped by said clamping member and urged by said carriage against said igniting means in said igniting condition while said switch is closed, so as to be lighted and then moved away from said igniting means while said switch is opened.

2. In a device for dispensing lighted cigarettes, in combination, a circuit including a switch; heating resistance means connected into said circuit and being in igniting condition when said switch is closed; carriage means movable toward and away from said heating resistance means between a cigarette dispensing position farther spaced from said heating resistance means and a cigarette igniting position closer spaced from said heating resistance means, and an intermediate cigarette receiving position, said carriage means including a spring loaded clamping member movable between a retracted position and a cigarette clamping position for slidably holding a cigarette on said carriage means, said clamping member tending to assume said clamping position; a cigarette magazine; feeding means for feeding single cigarettes from said cigarette magazine to said carriage means when the same is in said cigarette receiving position, said feeding means including at least one movable outlet member movable between a cigarette feeding position and a cigarette retaining position, said outlet member engaging said clamping member in said cigarette receiving position of said carriage means and moving said clamping member to said retracted position during movement of said outlet member to said feeding position; and operating means including cam means respectively connected to said carriage means, said switch means, and said movable outlet member for operating said carriage means, said switch, and said outlet member in a predetermined sequence so that a cigarette fed by said outlet member to said carriage is clamped by said clamping member and urged by said carriage against said igniting means in said igniting condition while said switch is closed, so as to be lighted and then moved away from said igniting means to said cigarette dispensing position while said switch is opened.

3. A device for dispensing lighted cigarettes as claimed in claim 2 wherein said operating means include an electric motor; and a manually operated contact means for energizing said motor.

4. A device for dispensing lighted cigarettes as claimed in claim 2 wherein said operating means include an electric motor; an electric circuit means connected to said motor and including a contact means movable between open and closed positions and tending to assume said open position; manually operated means for moving said contact means to said closed position; a blocking member connected to said motor for movement with the same and assuming during each revolution a single releasing position; and blocking linkage means connecting said turnable blocking member with said contact means, said linkage means holding said contact means in said closed position and releasing said contact means for return to said open position when said blocking member assumes said releasing position.

5. A device as claimed in claim 4 wherein said blocking member includes a turnable disc formed with a recess; and wherein said linkage means include a pin sliding on said disc during rotation of the same and advancing into said recess when said blocking member assumes said releasing position.

6. In a device for dispensing lighted cigarettes, in combination, a circuit including a switch; heating resistance means connected into said circuit and being in igniting condition when said switch is closed; carriage means movable toward and away from said heating resistance means between a cigarette dispensing position farther spaced from said heating resistance means and a cigarette igniting position closer spaced from said heating resistance means, and an intermediate cigarette receiving position, said carriage means including a spring loaded clamping member movable between a retracted position and a cigarette clamping position for slidably holding a cigarette on said carriage means, said clamping member tending to assume said clamping position; a cigarette magazine; feeding means for feeding single cigarettes from said cigarette magazine to said carriage means when the same is in said cigarette receiving position, said feeding means including at least one movable outlet member movable between a cigarette feeding position and a cigarette retaining position, said outlet member engaging said clamping member in said cigarette receiving position of said carriage means and moving said clamping member to said retracted position during movement of said outlet member to said feeding position; rotary drive means; a rotary carriage control cam means driven by said drive means and having an annular control cam track; first motion transmitting means including a control cam follower engaging said control cam track, said first motion transmitting means being connected to said carriage means for moving the same between said positions of the same; a rotary feed control cam lug driven by said drive means; second motion transmitting means actuated by said feed control cam lug to move to an actuating position, said second motion transmitting means being connected to said movable outlet member and moving the same to said cigarette feeding position when in said actuating position while said carriage means is in said cigarette receiving position; and a rotary switch control cam driven by said drive means and engaging said switch for closing the same when said carriage moves toward said cigarette igniting position.

7. In a device for dispensing lighted cigarettes, in combination, a circuit including a switch; heating resistance means connected into said circuit and being in igniting condition when said switch is closed; carriage means movable toward and away from said heating resistance means between a cigarette dispensing position farther spaced from said heating resistance means and a cigarette igniting position closer spaced from said heating resistance means, and an intermediate cigarette receiving position, said carriage means including a spring loaded clamping member movable between a retracted position and a cigarette clamping position for slidably holding a cigarette on said carriage means, said clamping member tending to assume said clamping position; a cigarette magazine; feeding means for feeding single cigarettes from said cigarette magazine to said carriage means when the same is in said cigarette receiving position, said feeding means including at least one movable outlet member movable between a cigarette feeding position and a cigarette retaining position, said outlet member engaging said clamping member in said cigarette receiving position of said carriage means and moving said clamping member to said retracted position during movement of said outlet member to said feeding position; rotary drive means; a rotary carriage control cam means driven by said drive means and having an annular control cam track; first motion transmitting means including a control cam follower engaging said control cam track, said first motion transmitting means being connected to said carriage means for moving the same between said positions of the same; resilient means connected to said first motion transmitting means for urging the same into a position in which said carriage means is in said cigarette igniting position; a rotary feed control cam lug driven by said drive means; second motion transmitting means actuated by said feed control cam lug to move to an actuating position, said second motion transmitting means being connected to said movable outlet member and moving during movement to said actuating position said movable outlet member to said cigarette feeding position while said carriage means is in said cigarette receiving position; and a rotary switch control cam driven by said drive means and engaging said switch for closing the same when said carriage moves toward said cigarette igniting position.

8. A device as claimed in claim 7 and comprising a stationary support supporting said heating resistance, and slidably supporting said carriage means; and wherein said first motion transmitting means include a lever pivotally mounted on said support and having said control cam follower at one end thereof; a control rod shiftably mounted on said support for movement in longitudinal direction thereof and engaging at one end thereof the other end of said lever; articulated lever means pivotally mounted on said support and being pivotally connected to the other end of said control rod, said lever means being pivotally connected to said carriage means; and wherein said resilient means abut at one end thereof against said support and at the other end thereof against said control rod.

9. A device as claimed in claim 7 wherein said control cam track has a first portion for movement of said carriage means from said dispensing position to said receiving position, a second portion for holding said carriage means in said receiving position until said feeding means feed a cigarette to said carriage means, a third portion for movement of said carriage means to said igniting position, a fourth portion for holding said carriage means in said igniting position for a predetermined time period, and a fifth portion for moving said carriage means from said igniting position to said dispensing position.

10. In a device for dispensing lighted cigarettes, in combination, a circuit including a switch; heating resistance means connected into said circuit and being in igniting condition when said switch is closed; carriage means movable toward and away from said heating resistance means between a cigarette dispensing position farther spaced from said heating resistance means and a cigarette igniting position closer spaced from said heating resistance means, and an intermediate cigarette receiving position, said carriage means including a spring loaded clamping member movable between a retracted position and a cigarette clamping position for slidably holding a cigarette on said carriage means, said clamping member tending to assume said clamping position; a cigarette magazine; feeding means for feeding single cigarettes from said cigarette magazine to said carriage means when the same is in said cigarette receiving position, said feeding means including a pair of pivotable outlet members movable between a cigarette feeding position and a cigarette retaining position, one of said outlet members slidably engaging said clamping member for moving the same to said retracted position during movement of said one outlet member to said feeding position; rotary drive means; a rotary carriage control cam means driven by said drive means and having an annular control cam track; first motion transmitting means including a control cam follower engaging said control cam track, said first motion transmitting means being connected to said carriage means for moving the same between said positions of the same; a rotary feed control cam lug driven by said drive means; a pair of levers respectively connected to said pivotable outlet members for movement with the same; a pivoted link connecting said pair of levers; a cam follower projection on one of said levers engaged by said rotary feed control cam lug during rotation of the same when said carriage means is in said cigarette receiving position, said pair of levers moving said outlet members to said cigarette feeding position when said feed control cam engages said cam follower projection; and switch operating means for closing said switch when said carriage moves toward said cigarette igniting position and for opening said switch when said carriage means moves toward said cigarette dispensing position.

11. In a device for dispensing lighted cigarettes, in combination, a circuit including a switch; heating resistance means connected into said circuit and being in igniting condition when said switch is closed; carriage means movable toward and away from said heating resistance means between a cigarette dispensing position farther spaced from said heating resistance means and a cigarette igniting position closer spaced from said heating resistance means, and an intermediate cigarette receiving position, said carriage means including a spring loaded clamping member movable between a retracted position and a cigarette clamping position for slidably holding a cigarette on said carriage means, said clamping member tending to assume said clamping position; a cigarette magazine; feeding means for feeding single cigarettes from said cigarette magazine to said carriage means when the same is in said cigarette receiving position, said feeding means including a pair of pivotable outlet members movable between a cigarette feeding position and a cigarette retaining position, one of said outlet members slidably engaging said clamping member for moving the same to said retracted position during movement of said one outet member to said feeding position; rotary drive means; a rotary carriage control cam means driven by said drive means and having an annular control cam track; first motion transmitting means including a control cam follower engaging said control cam track, said first motion transmitting means being connected to said carriage means for moving the same between said positions of the same; a rotary feed control cam lug driven by said drive means; a pair of levers respectively connected to said pivotable outlet members for movement with the same; a pivoted link connecting said pair of levers; a cam follower projection on one of said levers engaged by said rotary feed control cam lug during rotation of the same when said carriage means is in said cigarette receiving position, said pair of levers moving said outlet members to said cigarette feeding position when said feed control cam engages said cam follower projection; and a rotary switch control cam driven by said drive means and engaging said switch for closing the same when said carriage means moves from said cigarette receiving position toward said cigarette igniting position and for opening said switch when said carriage means moves toward said cigarette dispensing position.

12. A device as claimed in claim 11 and including spring means urging said pair of outlet members into said cigarette retaining position; and wherein said magazine has an outlet, and a cigarette supporting projection projecting into said outlet and extending between said outlet members in said cigarette retaining position.

13. In a device for dispensing lighted cigarettes, in combination, a circuit including a switch; heating resistance means connected into said circuit and being in igniting condition when said switch is closed; carriage means movable toward and away from said heating resistance means between a cigarette dispensing position farther spaced from said heating resistance means and a cigarette igniting position closer spaced from said heating resistance means, and an intermediate cigarette receiving position, said carriage means including a clamping member movable between a retracted position, a fully advanced position, and an intermediate cigarette clamping position for slidably holding a cigarette on said carriage means; spring means mounted on said carriage means and urging said clamping member toward said clamping and advanced positions; a cigarette magazine; feeding means for feeding single cigarettes from said cigarette magazine to said carriage means when the same is in said cigarette receiving position, said feeding means including at least one movable outlet member movable between a cigarette feeding position and a cigarette retaining position, said outlet member engaging said clamping member in said cigarette receiving position of said carriage means and moving said clamping member to said retracted position during movement of said outlet member to said feeding position; a circuit including a signal lamp and a pair of contacts connected in said circuit, one of said contacts being mounted on said clamping member and engaging the other contact when said clamping member is in said retracted and clamping positions, and being spaced from the other contact when said clamping member is in said fully advanced position whereby said signal lamp indicates the presence of a cigarette on said carriage means; and operating means including cam means respectively connected to said carriage means, said switch means, and said movable outlet member for operating said carriage means, said switch, and said outlet member in a predetermined sequence so that a cigarette fed by said outlet member to said carriage is clamped by said clamping member and urged by said carriage against said igniting means in said igniting condition while said switch is closed, so as to be lighted and then moved away from said igniting means to said cigarette dispensing position while said switch is opened.

14. In a device for dispensing lighted cigarettes, in combination, igniting means; a carriage means movable toward and away from said igniting means between a cigarette dispensing position farther spaced from said igniting means and a cigarette igniting position closer spaced from said igniting means, and an intermediate cigarette receiving position; a cigarette magazine; feeding means for feeding single cigarettes from said cigarette magazine to said carriage means when the same is in said cigarette receiving position; operating means including a control cam having an annular control cam track, and motion-transmitting means including a cam follower egaging said control cam track, said motion-transmitting means being connected to said carriage means for moving the same between said positions, said control cam track having a first portion for movement of said carriage means from said dispensing position to said receiving position, a second portion for holding said carriage means in said receiving position until said feeding means feeds a cigarette to said carriage means, a third portion for movement of said carriage to said igniting position, a fourth portion for holding said carriage means in said igniting position for a predetermined time period, and a fifth portion for movement of said carriage means from said igniting position to said dispensing position; a cam lug connected to said control cam for rotation therewith; other motion-transmitting means operated by said cam lug and connected to said feeding means for operating the same in a predetermined sequence with the movements of said carriage means between said positions so that a cigarette fed by said feeding means to said carriage means in said cigarette receiving position is urged by said carriage means in said igniting position against said igniting means and then moved away from said igniting means to said cigarette dispensing position in ignited condition.

15. In a device for dispensing lighted cigarettes in combination, igniting means; a carriage means movable toward and away from said igniting means between a cigarette receiving position farther spaced from said igniting means and a cigarette igniting position closer spaced from said igniting means; a cigarette magazine formed with an outlet; a cigarette supporting projection bounding said outlet; a pair of oppositely arranged outlet members arranged in said magazine in the region of said outlet and forming together a downwardly extending passage for a single cigarette, said outlet members being pivotally mounted on said magazine for movement in substantially parallel position between a cigarette retaining position in which said cigarette supporting projection closes the lower end of said passage and a cigarette feeding position in which said passage is located opposite said outlet so that a single cigarette may drop through said outlet, one of said outlet members being formed with at least one opening passing therethrough; at least one cigarette retaining means secured to said magazine and located opposite said opening, said cigarette retaining means being located outside of said passage in said cigarette retaining position of said outlet members, and projecting through said opening transversely into said passage when said outlet members are in said cigarette feeding position for retaining in said magazine all cigarettes but one; and operating means connected to said carriage for moving said carriage means between said positions and connected to said outlet members for moving said outlet members to said cigarette feeding position when said carriage means is in said cigarette receiving position, said operating means holding said outlet members in said cigarette retaining position while said carriage means moves toward and away from said igniting position; motor means connected to said operating means for actuating the same; and automatic means for stopping said motor means when said operating means have completed an operational cycle during which said carriage means move from said cigarette receiving position to said igniting position and back to said cigarette receiving position.

16. In a device for dispensing cigarettes, in combination, a cigarette magazine formed with an outlet; a cigarette supporting projection bounding said outlet; a pair of outlet members arranged in said magazine in the region of said outlet and forming together a downwardly extending passage for a single cigarette, said outlet members being movable between a cigarette retaining position in which said cigarette supporting projection closes the lower end of said passage and a cigarette feeding position in which said passage is located opposite said outlet so that a single cigarette may drop through said outlet, one of said outlet members being formed with at least one opening passing therethrough; at least one cigarette retaining means secured to said magazine and located opposite said opening, said cigarette retaining means being located outside of said passage in said cigarette retaining position of said outlet members, and projecting through said opening transversely into said passage when said outlet members are in said cigarette feeding position for retaining in said magazine all cigarettes but one; a carriage means mounted underneath said outlet for movement between a cigarette receiving position and a cigarette dispensing position, said carriage means including a spring-loaded clamping member movable between a retracted position and a cigarette clamping position for slidably engaging the cigarette, said clamping member tending to assume said clamping position, said clamping member slidingly engaging one of said outlet members and being held in said retracted position for receiving a cigarette when said outlet members are in said feeding position; and operating means for moving said outlet members and said carriage means between said positions of the same in a predetermined sequence so that a cigarette fed to said carriage means in said cigarette receiving position moves with the same to said dispensing position.

17. In a device for dispensing lighted cigarettes, in combination, igniting means; a carriage means movable toward and away from said igniting means between a cigarette receiving position farther spaced from said igniting means and a cigarette igniting position closer spaced from said igniting means, said carriage means including a spring-loaded clamping member movable between a retracted position and a cigarette clamping position and tending to assume said clamping position; a cigarette magazine formed with an outlet; a cigarette supporting projection bounding said outlet; a pair of outlet members arranged in said magazine in the region of said outlet and forming together a downwardly extending passage for a single cigarette, said outlet members being movable between a cigarette retaining position in which said cigarette supporting projection closes the lower end of said passage and a cigarette feeding position in which said passage is located opposite said outlet so that a single cigarette may drop through said outlet, one of said outlet members being formed with at least one opening passing therethrough and slidably engaging said clamping member, said one of said outlet members holding said clamping member in said retracted position while said one outlet member is in said cigarette feeding position; at least one cigarette retaining means secured to said magazine and located opposite said opening, said cigarette retaining means being located outside of said passage in said cigarette retaining position of said outlet members, and projecting through said opening transversely into said passage when said outlet members are in said cigarette feeding position for retaining in said magazine all cigarettes but one; and operating means for moving said carriage means between said positions and for moving said outlet members to said cigarette feeding position when said carriage means is in said cigarette receiving position and for holding said outlet members in said cigarette retaining position while said carriage means moves toward and away from said igniting position.

18. In a device for dispensing lighted cigarettes, in combination, a support including two spaced end walls and a partitioning wall arranged intermediate said end walls and formed with a first opening, one of said end walls being formed with a second dispensing opening; an igniting means mounted on the other of said end walls and having an igniting surface located opposite said first opening and being aligned with the same; a cigarette magazine located between said partitioning wall and said one end wall; a carriage means movably mounted on said support between said partitioning wall and said one end wall for movement between a cigarette igniting position located adjacent said partitioning wall and a cigarette dispensing position located adjacent said one end wall, said carriage means including a spring loaded clamping member movable between a retracted position and a clamping position for slidably clamping a cigarette; feeding means for feeding a single cigarette from said cigarette magazine to said carriage means, said feeding means including at least one outlet member movable between a cigarette retaining position and a feeding position and slidably engaging said clamping member, said outlet member holding in said feeding position said clamping member in said retracted position; and operating means for moving said carriage means between said positions and for operating said feeding means in a predetermined sequence.

19. In a device for dispensing lighted cigarettes, in combination, a support including two spaced end walls and a partitioning wall arranged intermediate said end walls and formed with a first opening, one of said end walls being formed with a second dispensing opening; a circuit including a signal lamp mounted on said one end wall and adapted to illuminate said dispensing opening; a contact bar connected in said circuit and extending between said one end wall and said partitioning wall; an igniting means mounted on the other of said end walls and having an igniting surface located opposite said first opening and being aligned with the same; a cigarette magazine located between said partitioning wall and said one end wall; a carriage means movably mounted on said support between said partitioning wall and said one end wall for movement between a cigarette igniting position located adjacent said partitioning wall and a cigarette dispensing position located adjacent said one end wall, said carriage means including a spring loaded clamping member movable between a retracted position, a clamping position for slidably clamping a cigarette, and a fully advanced position; a contact connected in said circuit and secured to said clamping member, said contact slidably engaging said contact bar when said clamping member is in said retracted and clamping positions, and being spaced from said clamping bar when said clamping member is in said fully advanced position so that said signal lamp illuminates said dispensing opening when a cigarette is on said carriage means; feeding means for feeding a single cigarette from said cigarette magazine to said carriage means, said feeding means including at least one outlet member movable between a cigarette retaining position and a feeding position and slidably engaging said clamping member, said outlet member holding in said feeding position said clamping member in said retracted position; and operating means for moving said carriage means between said positions and for operating said feeding means in a predetermined sequence.

20. In a device for dispensing lighted cigarettes, in combination, a circuit including a switch; heating resistance means connected into said circuit and being in igniting condition when said switch is closed; carriage means movable toward and away from said heating resistance means between a cigarette receiving position farther spaced from said heating resistance means and a cigarette igniting position closer spaced from said heating resistance means, said carriage means including a spring loaded clamping member movable between a retracted position and a cigarette clamping position for slidably holding a cigarette on said carriage means, said clamping member tending to assume said clamping position; a cigarette magazine; feeding means for feeding single cigarettes from said cigarette magazine to said carriage means when the same is in said cigarette receiving position, said feeding means including at least one movable outlet member movable between a cigarette feeding position and a cigarette retaining position, said outlet member engaging said clamping member in said cigarette receiving position of said carriage means and moving said clamping member to said retracted position during movement of said outlet member to said feeding position; operating means including cam means respectively connected to said carriage means, said switch means, and said movable member for operating said carriage means, said switch, and said outlet member in a predetermined sequence so that a cigarette fed by said outlet member to said carriage is clamped by said clamping member and urged by said carriage against said igniting means in said igniting condition and then moved away from said igniting means in ignited condition while said switch is opened; a circuit including electric motor means and contact means, said electric motor means actuating said operating means when said contact means is closed; another circuit including electro-magnetic means having a movable member connected to said contact means for operating the same; and switch means connected into said other circuit for operating said electromagnetic means and thereby said electric motor means.

21. A device as claimed in claim 20 wherein said switch means is coin-operated.

22. In a device for dispensing lighted cigarettes, in combination, a circuit including a switch; heating resistance means connected into said circuit and being in igniting condition when said switch is closed; carriage means movable toward and away from said heating resistance means between a cigarette dispensing position farther spaced from said heating resistance means and a cigarette igniting position closer spaced from said heating resistance means, and an intermediate cigarette receiving position, said carriage means including a spring loaded clamping member movable between a retracted position and a cigarette clamping position for slidably holding a cigarette on said carriage means, said clamping member tending to assume said clamping position; a cigarette magazine; feeding means for feeding single cigarettes from said cigarette magazine to said carriage means when the same is in said cigarette receiving position, said feeding means including at least one movable outlet member movable between a cigarette feeding position and a cigarette retaining position, said outlet member engaging said clamping member in said cigarette receiving position of said carriage means and moving said clamping member to said retracted position during movement of said outlet member to said feeding position; operating means including cam means respectively connected to said carriage means, said switch means, and said movable outlet member for operating said carriage means, said switch, and said outlet member in a predetermined sequence so that a cigarette fed by said outlet member to said carriage is clamped by said clamping member and urged by said carriage against said igniting means in said igniting condition and then moved away from said igniting means to said cigarette dispensing position in ignited condition while said switch is opened; a housing enveloping said switch, said heating resistance means, said carriage means, said magazine, said feeding means, and said operating means, said housing having an end wall formed with a dispensing opening through which a cigarette is adapted to partly project when said carriage means is in said dispensing position, said housing having a bottom wall formed with a cleaning opening located underneath said heating resistance means; and a receptacle member movably attached to said bottom wall of said housing and covering said cleaning opening in the same, said receptacle member being adapted to receive particles dropping from a cigarette while the same is being ignited.

23. A device as claimed in claim 22 and including a signal lamp mounted on said end wall and adapted to illuminate said dispensing opening; and means for energizing said signal lamp when said clamping member is in said clamping position whereby said signal lamp is adapted to indicate the presence of a cigarette in said carriage means.

24. In a device for dispensing lighted cigarettes, in combination, igniting means; a carriage means movable toward and away from said igniting means between a cigarette igniting position closer spaced from said igniting means and a cigarette receiving position farther spaced from said igniting means; a cigarette magazine; feeding means for feeding single cigarettes from said magazine to said carriage means; first operating means connected to said carriage means for moving the same between said positions, and for holding the same for selected time periods in said positions; second operating means connected to said cigarette feeding means for operating the same; motor means for actuating said first and second operating means in a selected sequence so that said feeding means feed a single cigarette to said carriage means when the same is in said cigarette receiving position; manually operated means for starting said motor means; and automatic means for stopping said motor means after an operational cycle during which said carriage means moves from said receiving position to said igniting position and back to said receiving position.

25. A device for dispensing lighted cigarettes, comprising in combination, igniting means; a carriage means movable toward and away from said igniting means between a cigarette igniting position closer spaced from said igniting means, a cigarette dispensing position farther spaced from said igniting means, and an intermediate cigarette receiving position; a cigarette magazine; feeding means for feeding single cigarettes from said magazine to said carriage means; first operating means connected to said carriage means for moving the same between said positions and for holding the same for selected time periods in said positions; second operating means connected to said cigarette feeding means for operating the same; motor means for actuating said first and second operating means in a selected sequence so that said feeding means feed a single cigarette to said carriage means when the same is in said cigarette receiving position; manually operated means for starting said motor means so that said carriage means moves from said cigarette dispensing position to said receiving and igniting positions, and then back to said dispensing position; and automatic means for stopping said motor means after an operational cycle during which said carriage means has moved from said dispensing position to said igniting position and back to said dispensing position.

26. A device for dispensing lighted cigarettes comprising, in combination, igniting means; a carriage means movable toward and away from said igniting means between a cigarette receiving position farther spaced from said igniting means and a cigarette igniting position closer spaced from said igniting means, said carriage means including a clamping member movable between a retracted position and a cigarette clamping position for holding a cigarette on said carriage means and tending to assume said clamping position; a cigarette magazine; feeding means for feeding single cigarettes from said magazine to said carriage means, said feeding means including at least one movable outlet member movable between a cigarette feeding position and a cigarette retaining position, said outlet member engaging said clamping member in said cigarette receiving position of said carriage means and moving said clamping member to said retracted position during movement of said outlet member to said feeding position; first operating means connected to said carriage means for moving the same between said positions; second operating means connected to said cigarette feeding means for operating said outlet member; motor means for actuating said first and second operating means in a selected sequence so that said outlet member moves to said cigarette feeding position and moves said clamping member to said retracted position when said carriage means is in said cigarette receiving position; and automatic means for stopping said motor means after an operation cycle during which said carriage means moves from said cigarette receiving position to said cigarette igniting position and back to said cigarette receiving position.

27. A device for dispensing lighted cigarettes comprising, in combination, igniting means; a carriage means movable toward and away from said igniting means between a cigarette receiving position farther spaced from said igniting means and a cigarette igniting position closer spaced from said igniting means, said carriage means including a clamping member movable between a retracted position and a cigarette clamping position for holding a cigarette on said carriage means and tending to assume said clamping position; a cigarette magazine; feeding means for feeding single cigarettes from said magazine to said carriage means, said feeding means including at least one movable outlet member movable between a cigarette feeding position and a cigarette retaining position, said outlet member engaging said clamping member in said cigarette receiving position of said carriage means and moving said clamping member to said retracted position during movement of said outlet member to said feeding position; and operating means connected to said carriage means and to said outlet member for moving said carriage means between said positions and for operating said outlet member in a selected sequence with the carriage movements so that said outlet member moves to said cigarette feeding position and moves said clamping member to said retracted position when said carriage means is in said cigarette receiving position.

28. In a device for dispensing lighted cigarettes, in combination, a circuit including a switch and heating resistance igniting means; a carriage means movable toward and away from said igniting means between a cigarette igniting position closer spaced from said igniting means and a cigarette receiving position farther spaced from said igniting means; a cigarette magazine; feeding means for feeding single cigarettes from said magazine to said carriage means; first operating means connected to said carriage means for moving the same between said positions, and for holding the same for selected time periods in said positions; second operating means connected to said cigarette feeding means for operating the same; third operating means for operating said switch; motor means for actuating said first, second and third operating means in a selected sequence so that said feeding means feed a single cigarette to said carriage means when the same is in said cigarette receiving position and so that said heating resistance igniting means is energized when said carriage means is in said cigarette igniting position; manually operated means for starting said motor means; and automatic means for stopping said motor means after an operational cycle during which said carriage means moves from said receiving position to said igniting position and back to said receiving position.

29. A device for dispensing lighted cigarettes, comprising, in combination, a circuit including a switch and heating resistance igniting means; a carriage means movable toward and away from said igniting means between a cigarette igniting position closer spaced from said igniting means, a cigarette dispensing position farther spaced from said igniting means, and an intermediate cigarette receiving position; a cigarette magazine; feeding means for feeding single cigarettes from said magazine to said carriage means; first operating means connected to said carriage means for moving the same for selected time periods in said positions; second operating means connected to said cigarette feeding means for operating the same; third operating means for operating said switch; motor means for actuating said first, second and third operating means in a selected sequence so that said feeding means feed a single cigarette to said carriage means when the same is in said cigarette receiving position and so that said heating resistance igniting means is energized when said carriage means is in said cigarette igniting position; manually operated means for starting said motor means so that said carriage means moves from said cigarette dispensing position to said receiving and igniting positions, and then back to said dispensing position; and automatic means for stopping said motor means after an operational cycle during which said carriage means has moved from said dispensing position to said igniting position and back to said dispensing position.

30. In a devce for dispensing lighted cigarettes, in combination, a circuit including a switch and heating resistance igniting means; a carriage means movable toward and away from said igniting means between a cigarette igniting position closer spaced from said igniting means and a cigarette receiving position farther spaced from said igniting means; a cigarette magazine; feeding means for feeding single cigarettes from said magazine to said carriage means; first operating means connected to said carriage means for moving the same between said positions, and for holding the same for selected time periods in said positions; second operating means connected to said cigarette feeding means for operating the same; and third operating means for operating said switch; said first, second and third operating means being connected to each other for operation in a selected sequence so that said feeding means feed a single cigarette to said carriage means when the same is in said cigarette receiving position and so that said heating resistance igniting means is energized when said carriage means is in said cigarette igniting position; and motor means for driving said first, second and third operating means through a single operational cycle.

31. A device as set forth in claim 30 wherein said carriage means is movable to a dispensing position farther spaced from said igniting means than in said cigarette receiving position, and is normally in said dispensing position; and wherein said first operating means moves said carriage means from said dispensing position through said cigarette receiving position to said cigarette igniting position and back to said cigarette dispensing position during each operational cycle; and wherein each of said operating means includes a turnable cam means; and a shaft driven from said motor means and connecting said cam means for simultaneous rotation.

References Cited in the file of this patent

UNITED STATES PATENTS

| | | |
|---|---|---|
| 1,639,295 | Jesnig | Aug. 16, 1927 |
| 1,727,002 | Weaver | Sept. 3, 1929 |
| 1,974,462 | Jay | Sept. 25, 1934 |
| 1,984,070 | La Vercombe | Dec. 11, 1934 |
| 2,028,787 | Lane | Jan. 28, 1936 |
| 2,083,465 | Mayer | June 8, 1937 |
| 2,085,121 | Randazzo | June 29, 1937 |
| 2,108,376 | Copeland | Feb. 15, 1938 |